United States Patent [19]

Umebayashi et al.

[11] Patent Number: 4,935,389
[45] Date of Patent: Jun. 19, 1990

[54] HIGH STRENGTH HIGH OXIDATION-RESISTANCE SIALON SINTERED BODY

[75] Inventors: Seiki Umebayashi; Kazushi Kishi, both of Tosu; Kazuya Yabuta; Hiroaki Nishio, both of Tokyo, all of Japan

[73] Assignees: NKK Corporation; Government Industrial Research Institute, both of Tokyo, Japan

[21] Appl. No.: 357,139

[22] Filed: May 26, 1989

[30] Foreign Application Priority Data

May 30, 1988 [JP] Japan .................. 63-130339

[51] Int. Cl.$^5$ .............................................. C04B 35/58
[52] U.S. Cl. ...................................... 501/98; 501/87; 501/89; 501/92; 501/97
[58] Field of Search ............... 501/92, 97, 98.87, 89

[56] References Cited

U.S. PATENT DOCUMENTS 4,243,621  1/1981  Mori et al. ..................... 501/89

FOREIGN PATENT DOCUMENTS 0124199 11/1984 European Pat. Off. .
0293142 11/1988 European Pat. Off. .
 199585  8/1986 Japan .

OTHER PUBLICATIONS

Sun et al, CA106(16):124506w, 1986.

Primary Examiner—William R. Dixon, Jr.
Assistant Examiner—Deborah Jones
Attorney, Agent, or Firm—Sughrue, Mion, Zinn, Macpeak & Seas

[57] ABSTRACT

A ceramic material comprising a double phase complex sialon sintered body of $\beta'$-type sialon and O'-type sialon being composed of the four elements of Si, Al, O and N and having a ratio of $\beta'$-type sailon/O'-type sialon of 7/1 to 3/5 by weight ratio.

The $\beta'$-phase-O'-phase complex sailon has a dense structure and is excellent in high strength and high oxidation-resistance.

4 Claims, No Drawings

HIGH STRENGTH HIGH OXIDATION-RESISTANCE SIALON SINTERED BODY

BACKGROUND OF THE INVENTION

1. Field of the Invention

This invention relates to a sialon sintered body useful as a material for high temperature structure and a process for producing the same.

2. Description of the Prior Art

Recently, heat-resistant ceramics have widely been developed, and sintered bodies of silicon nitride ($Si_3N_4$) are known as the materials excellent in high temperature properties. Since the silicon nitride has a high covalent bond property, it is not easy to be sintered. Therefore, it is difficult to obtain a dense $Si_3N_4$ body without sintering additions. Thereupon, a rare earth element oxide such as $Y_2O_3$ are added to $Si_3N_4$ powder (Japanese Patent KOKOKU No. 56-28865). As the compositions capable of exhibiting strength at a relatively high temperature, there are simultaneous blending of $Y_2O_3$ and $Al_2O_3$ with $Si_3N_4$ (Japanese Patent KOKOKU No. 49-21091) and simultaneous blending of $Y_2O_3$, $Al_2O_3$ and AlN with $Si_3N_4$ (Japanese Patent KOKAI No. 59-182276).

On the other hand, sialon has also widely been studied on the premise of blending $Y_2O_3$, and it is known that $\beta'$-phase ($Si_{6-z}Al_zO_zN_{8-z}$) and O'-phase ($Si_{2-x}Al_xO_{1+x}N_{2-x}$) have a high oxidation resistance (Non Oxide Tech. Eng. Cerum., pp. 1-30, pp. 105-117, 1986). $\alpha$-sialon ($M_x(Si,Al)_{12}(O,N)_{16}$) produced from $Si_3N_4$, $Y_2O_3$ and AlN is also known to be stable in a high temperature region, and its sintering method was reported in detail (Japanese Patent KOKOKU No. 61- 309).

In the above studies, since a rare earth element oxide such as $Y_2O_3$ is added, a glass phase of $Y_2O_3$—$SiO_2$—$Si_3N_4$—$Al_2O_3$, a merrilite phase of $Y_2O_3$—$Si_3N_4$ or YAG phase is deposited at grain boundary. When the temperature of these grain boundary phases elevates higher than 1200° C., they soften or creep resulting a sharp decrease in a high temperature strength. Moreover, in the case of blending $Y_2O_3$, there is a significant problem in addition to the above decrease in high temperature strength. It is a remarkable inferiority in the oxidation properties of the sintered body. When a sintered body containing $Y_2O_3$ is oxidized, $SiO_2$—$Y_2O_3$ deposits on the surface. This phase does not form a dense membrane, and oxidation proceeds to the inside. When the temperature is elevated over 1500° C., leaching of $Y_2O_3$ existing in grain boundary occurs, and sintered body strength sharply decreases.

On the other hand, in the case of the sintered bodies containing 4 elements of Si,Al,O and fundamental elements (Japanese Patent KOKOKU Nos. 51-15850, 51-37656, 51-37657), the above problems caused by $Y_2O_3$ are solved. Referring to oxidation properties, since a dense $SiO_2$ glass layer is formed as the oxidation resistant layer in the sintered body composed of Si—Al—O—N, they are considerably improved.

However, there is still a problem in a high temperature strength in the system composed of Si—Al—O—N. That is, when $Al_2O_3$ powder is blended with $Si_3N_4$ powder, X'-sialon called pseudo-mullite phase having a weak high temperature strength forms (Yogyo Kyokai-Shi, 93,10,629-635, 1985). As a method for avoiding the production of X'-phase, the inventors noted the mixture state of $Al_2O_3$ with $Si_3N_4$, and found that the production of X'-phase can be inhibited by using a metal alkoxide as a starting material (Japanese Patent KOKAI No. 61-186266).

SUMMARY OF THE INVENTION

An object of the invention is to provide a sialon sintered body having a high temperature strength and a high oxidation resistance.

The inventors have investigated in order to develop a ceramic excellent in high temperature strength and oxidation resistance from Si—Al—O—N group ceramics, and found that a complex structure of O'-sialon phase ($Si_{2-x}Al_xO_{1+x}N_{2-x}$, hereafter abbreviated as O'-phase) and $\beta'$-sialon phase ($Si_{6-z}Al_zO_zN_{8-z}$, hereafter abbreviated as $\beta'$-phase) has a possibility to become a material excellent in mechanical properties, particularly in a high temperature strength. The O'-phase contains relatively much columnar crystals, and the $\beta'$-phase contains relatively much equi-axed crystals. The complex structure is formed by controlling the ratio of O'-phase to $\beta'$-phase, and therefore the sintered body of the invention is a novel complex sialon sintered body quite different from the sintered body composed of $\beta'$-phase alone disclosed in Japanese Patent KOKOKU No. 56-51153. In the present invention, since a dense sintered body is formed in fundamentally Si—Al—O—N component system without adding a sintering assistant such as $Y_2O_3$, to develop a facilitated sintering process is important. In other words, the O'-phase-$\beta'$-phase complex sialon of the invention could be produced by the completion of the facilitated sintering process.

DETAILED DESCRIPTION OF THE INVENTION

The $\beta'$-phase—O'-phase complex sialon sintered body of the invention is produced according to the following process.

The starting materials may be blended so as to contain 4 elements of Si,Al,O and N in a prescribed ratio, and selected from various nitrides such as $Si_3N$ and AlN, solid solutions thereof, oxides such as $SiO_2$,$Al_2O_3$ and mullite, metals such as Si and Al, alloys thereof, and gases such as $N_2$ and $O_2$. A simple starting material mixture is a mixture of $Si_3N_4$, $Al_2O_3$ and $SiO_2$. While, the starting materials is restricted by the composition in order to form the complex sialon sintered body of the invention. The composition forms the two phases of $\beta'$-phase and O'-phase at a thermodynamical equilibrium, and in such a composition, the molar ratio of Si to Al is necessary to be not less than 5, preferably not less than 10. The molar ratio of 0 to N is necessary to not more than 0.5, preferably not more than 0.4. The mixture state of the starting materials is also important as well as the restriction of the composition. When $Si_3N_4$,$Al_2O_3$ and $SiO_2$ are employed as the starting materials, they must be mixed uniformly in order that $SiO_2$ and $Al_2O_3$ vanish in the sintering process. If $Al_2O_3$ particles having a particle size of more than 1 $\mu$m are contained, a glass phase or a liquid phase containing a great quantity of $Al_2O_3$ appear. The glass phase or the liquid phase does not transfer to $\beta'$-phase nor O'-phase, but remains in a form of X-phase resulting to produce a sintered body of which the high temperature strength is insufficient. Therefore, every starting material for forming the complex sialon is necessary to be fine powder. When $Al_2O_3$ is added in a form of powder, the particle size is preferably not less than 1 μm. While, $Al_2O_3$ is preferably added in a form of liquid or sol, such as a solution of Al alkoxide, an aqueous solution of a aluminum nitrate or sulfate and boehmite sol. Similarly, if $SiO_2$ particles having a particle size of more than 1 μm are contained, a glass phase of $SiO_2$ or a cristobalite phase finally appears resulting the decrease of high temperature strength. Therefore, $SiO_2$ is also preferably added in a form of liquid or sol such as a Si alkoxide solution or $SiO_2$ sol. Another preferable method is oxidation of $Si_3N_4$ particles. According to this method, a preferable mixture state can be obtained by coating $SiO_2$ on the surface of $Si_3N_4$. Therefore, an uniform mixture of $Si_3N_4$, $SiO_2$ and $Al_2O_3$ can be obtained by heating $Si_3N_4$ under oxidative atmosphere before or after mixing it with $Al_2O_3$. A suitable temperature of heat treatment under oxidative atmosphere is in the range of 800 to 1500° C. When the temperature is beyond 1500° C., the control of $SiO_2$ content is difficult because of rapid oxidation of $Si_3N_4$. While, when the temperature is less than 800° C., oxidation rate is too low. In the case of the production of $SiO_2$ by the oxidation of $Si_3N_4$, when the $Si_3N_4$ particle size is beyond 1 μm and the specific surface area is less than 5 $m^2/g$, the production of $SiO_2$ membrane is insufficient and not uniform.

An important process in the sintering process is the deposition of $\beta'$-phase and O'-phase from glass phase or liquid phase. In order to induce the deposition smoothly, to decrease the stability of the glass phase or liquid phase is the point. When the glass phase or liquid phase contains an alkali metal such as Na or K or an alkaline earth metal such as Mg or Ca as impurities, the stability of the glass phase and liquid phase increases. As a result, a great quantity of glass phase remains at grain boundary without transferring to $\beta'$-phase or O'-phase. When total amount of alkali metals and alkaline earth metals is beyond 500 ppm, the stability of glass phase and liquid phase remarkably increases, and the high temperature strength of the sintered body is low. Moreover, it is necessary to consider rare earth elements such as Y and Ce. When the glass phase or liquid phase contains $Y_2O_3$, these phases react with $Y_2O_3$ to produce yttria silicate. The yttria silicate remains at grain boundary, and results the decrease of high temperature strength. When the content is substantially less than 50 ppm, this phenomenon is not found.

To produce the phase seemed to be glass phase or liquid phase abundantly in an initial stage is effective for rendering the sintering process to proceed at a relatively low temperature and for achieving densification sufficiently. In order to realize a facilitated sintering process utilizing a glass phase or liquid phase which finally vanishes, in other words, utilizing nonequilibrium state, it is necessary to be well aware of the phase which is the stable region for the final composition. When the final composition is very close to the single phase of $\beta'$-phase, the glass phase rarely appears, and the sintered body is composed of the single phase of $\beta'$-phase. Therefore, densification proceeds by solid phase sintering, and the sintering rate is considerably slower than the pseudo-liquid phase sintering utilizing nonequilibrium state.

The inventors supposed that the slippage from $\beta'$-phase, i.e. the ratio of O'-phase to $\beta'$-phase, is important, and they conducted the following experiments for the investigation of the ratio.

A commercial $\beta$-$Si_3N_4$ powder was used as the standard sample of $\beta'$-phase, and O'-phase was prepared by themselves. As the preparation method of O'-phase, $Si_3N_4$ was mixed with $SiO_2$ in stoichiometric composition, and 0.03 mol (4.9 wt. %) of $CeO_2$ was added as sintering addition. The mixture was pressed by hot press at 1750° C. for 4 hours, and ground to obtain $Si_2N_2O$ powder. Though trace amount of WC was detected because of using WC vessel for grinding, X-ray diffraction pattern of $Si_2N_2O$ simplex was obtained. The $Si_2N_2O$ powder was mixed with the aforementioned $\beta$-$Si_3N_4$ powder in a prescribed ratio, and a calibration curve for the ratio of $\beta'$-phase to O'-phase was prepared. Various conditions such as blending of the starting materials, oxidation treatment and sintering were examined based upon the calibration curve, and as a result, dense and high temperature strength sintered bodies were produced when $\beta'$-phase/O'-phase is in the range of 7/1-3/5 by weight ratio. This phenomenon can be understood that, when the ratio of $\beta'$-phase/O'-phase is beyond 7/1, glass phase or liquid phase formed is insufficient and densification is insufficient. While, when the ratio is less than 3/5, the high strength high oxidation-resistance of $\beta'$-sialon is lost and glass phase remains to the last.

One of the characteristics of the sialon of the invention is permission of oxygen. In general, it is said that there is a problem in the use of aqueous solvent for wet mixing because aqueous solvent oxidizes $Si_3N_4$. However, in the case of the $\beta'$-phase—O'-phase complex sialon of the invention, water can be used. Of course, organic solvent can also be used. Since water can be used as solvent, atmosphere can be used in the spray dryer for preparing the powder for press. Therefore, treatments of powder can be facilitated.

Molding method may be selected from usual molding methods of ceramics such as press molding, injection molding, extrusion molding and slip casting according to the molded shape and the like.

Though sintering may also be carried out according to a known method, a high temperature for realizing the aforementioned facilitated sintering process is necessary. As mentioned previously, the sintering temperature varies according to the quantity of glass phase, the quantity of the starting materials to be dissolved and the quantity of $\beta'$-phase and O'-phase to be deposited. Moreover, the sintering temperature also greatly varies by the elevation rate of temperature, because the glass phase and liquid phase exist in nonequilibrium state.

In any case, unless the temperature is not lower than 1550° C., the aforementioned glass phase is not produced. While, when the temperature is beyond 2050° C., the gas pressure for inhibiting decomposition is beyond 1000 atm. Therefore, it is not suitable for industrial means. While, the utilization of pressuring is worthwhile in the vicinity of the temperature where the glass phase or liquid phase is produced. In the case of using hot pressing, the sintering temperature can be decreased by about 100° C. by loading a pressure of 300 $kg/cm^2$ compared with no pressure load. When a pressure of 2000 $kg/cm^2$ is loaded by a hot isostatic pressing (HIP), the sintering temperature can be decreased by about 200° C. Thus, when a pressed powder body is placed in a glass capsule, a suitable HIP temperature is 1550° to 1900° C. When a sufficient densification is not obtained even under nonoxidative atmosphere, a further densification can be conducted by HIP. A preferable process for producing the ceramic material of the invention comprises pressing a mixture of ceramic powders blended to a prescribed ratio, sintering the pressed powder body at a temperature of 1750° to 2050° C. under nonoxidative atomosphere to produce a sintered body having a relative density of not less than 92 and thereafter subjecting hot isostatic pressing to the sintered body. In such a case, the shape of the sintered body is not restricted by a die different from the case of hot pressing, and a capsule material is not necessary for the HIP. Therefore, in the case of a complex-shaped article, a dense sintered body can be produced. When the relative density of the sintered body sintered under nonoxidative atomosphere is not beyond 92%, the densification is not achieved by HIP because open pores remain in the sintered body. HIP has two great effects other than densification. One effect is the discharge of low melting point compounds such as Na and K out the sintered body by HIP treatment. Therefore, trace amount of unavoidable impurities existing at grain boundary can be removed by HIP treatment, and as a result, oxidation-resistance is improved. The other effect is the control of phase. When a sintered body sintered under nonoxidative atomosphere contains X-sialon, the X-sialon can be vanished, and the sintered body can be converted to $\beta'$-phase O'-phase complex sialon during HIP treatment.

The ceramic material of the invention produced through the above process is fundamentary composed of 4 elements of Si,Al,O and N, and it is a double phase complex body where $\beta'$-phase having $\beta$-type $Si_3N_4$ crystalline structure and O'-phase having $Si_2N_2O$ crystalline structure mix with each other. The ratio of $\beta'$-phase to O'-phase is in the range of 7:1 to 3:5 by weight ratio. As the impurities, total content of alkali metal elements such as Na and K and alkaline earth metal elements such as Mg and Ca is usually not more than 500 ppm, and total content of rare earth elements such as Y and Ce is usually not more than 50 ppm. The ceramic material of the invention may contain other impurities to the extent not so much damaging the high strength. The density of the ceramic material of the invention is high, i.e. usually about 3.02 to 3.14 g/cc, particularly about 3.08 to 3.12 g/cc. The three point flexural strength is about 50 to 100 kg/m², particularly about 60 to 90 kg/m² at room temperature and about 50 to 90 kg/m² at 1300° C.

The ceramic material of the invention may contain carbides such as SiC,TiC,ZrC,$Al_4C_3$ and $B_4C$, nitrides such as TiN,ZrN and BN, carbonitrides such as TiCN, borides such as $TiB_2$ and $ZrB_2$ and the like for progressing dispersion. Even in such a case, when the content of sialon is less than 50%, binding strength is weak, and the sintered body does not set. It is also important that the dispersed particle does not react with $\beta'$-phase nor O'-phase to produce low melting point crystals or glass phase. As mentioned previously, the ratio of $\beta'$-phase to O'-phase is also important. In the dispersion-progressed $\beta'$-phase—O'-phase complex sialon, the toughness is improved as well as the high temperature strength. The dispersion-progressing agent such as aforementioned carbides is preferably whisker-shaped.

The quantitive analysis of $\beta'$-phase and O'-phase may be carried out according to a known method such as X-ray diffraction or electron prove microanalysis.

The following alteration may occur with heating in the system where an uniform mixture state of $Si_3N_4$—$Al_2O_3$—$SiO_2$ is formed. When the temperature is elevated to 1400° C., mullite is produced from $SiO_2$ and $Al_2O_3$. By further elevating the temperature, mullite reacts with $Si_3N_4$ to produce glass L phase or liquid phase composed of Si—Al—O—N. $Si_3N_4$ begins to dissolve in the glass phase or liquid phase. When the glass phase or liquid phase reaches near saturation to a certain degree, $\beta'$-phase begins to deposit from the glass phase or liquid phase. The $\beta'$-phase grows with gradual variation of the composition of the glass phase or liquid phase The deposition of O'-phase simultaneously occurs with the deposition of $\beta'$-phase. All of $SiO_2$, $Al_2O_3$ and $Si_3N_4$ are dissolved in the glass phase or liquid phase, and varnish. Finally, the glass phase or liquid phase converts to $\beta'$-phase and O'-phase, and varnishes. The $\beta'$-phase-O'-phase complex sialon of the invention is formed through the process represented by mentioned above.

The $\beta'$-phase—O'-phase complex sialon of the invention has a dense structure and excellent properties in high strength, high oxidation-resistance and the like, and it can be used for the parts such as for gas turbine used at higher than 1300° C. under oxidative atomosphere.

EXAMPLES

EXAMPLE 1

Aluminum isopropoxide (0.9 kg on the basis of $Al_2O_3$) was dissolved in 20 l of n-hexane. 9.1 kg of commercial imide process $Si_3N_4$ powder was put in the above solution, and mixed by a ball mill for 24 hours to prepare a ceramic slurry. The slurry was dried by spray drying using $N_2$ gas, and a mixed powder was obtained. The mixed powder was calcined at 900° C. under atomosphere to oxidize it as well as to remove the remaining organic solvent.

The calcined powder was put in a mold, and pressed by uniaxial pressing at 30 MPa and then cold isostatic pressing (CIP) at 300 MPa to obtain a pressed powder body of 25×15×80 mm. In the sintering process, the temperature was elevated to 1900° C. at a rate of 10° C./min., and kept at the same temperature for 10 hours to produce a sintered body having a density of 2.98 g/cc. The sintered body was subjected to HIP at 1900° C. at 1900 atm for 2 hours to obtain a sintered body having a density of 3.09 g/cc.

The sintered body was cut and abraded, and the crystal phases of the abraded face was analyzed by X-ray diffraction method. As a result, the crystal phases were two phases of $\beta'$-phase and O'-phase alone. The content of the O'-phase was determined from the X-ray diffraction pattern and found to be 21 wt. %. Flexural test pieces having a size of 3×4×40 mm were quarried out of the sintered body. The three point flexural strength was measured at room temperature and at 1300° C., and found to be 81.0 and 82.3 kg/mm², respectively. When the flexural test piece was kept at 1300° C. in the atomosphere for 100 hours, the weight increase due to oxidation was not found at all.

EXAMPLE 2

The starting materials were 0.87 kg of $Si_3N_4$ (UBE INDUSTRIES), alumina sol (0.09 kg on the basis of $Al_2O_3$) and colloidal silica (0.04 kg on the basis of $SiO_2$). They were blended by a ball mill for 24 hours, and dried at 200° C. in vacuo. The mixed powder was ground by an agate mortar, and passed through 200 mesh sieve. Then, the mixed powder was put in a carbon mold, and calcined by hot pressing. The reaction of the mixed powder with the carbon mold was prevented by coating BN on the surface of the carbon mold.

The calcined body was heated up to 1200° C. in vacuo of less than 0.02 Torr for the purpose of the dehydration of alumina sol and colloidal silica. When the temperature is beyond 1200° C., the calcined body was hot-pressed by charging $N_2$ gas up to 9 kgf/cm². The time from ordinary temperature to 1200° C. is one hour, and then the temperature was elevated from 1200° C. to 1750° C. at a rate of 20 C/min. The temperature was kept at 1750° C. for 1 hour, and was then naturally cooled. The pressure was kept at a constant pressure of 300 kgf/cm² from 1200° C. to 1750° C., and then the pressure was released through the cooling period.

The size of the sintered body thus obtained was 30×40×8 mm, and the density was 3.02 g/cc. Flexural test pieces were quarried out of the sintered body, and flexural test was carried out. The flexural strength was 65 kg/mm² at ordinary temperature and 58 kg/mm² at 1300° C. The test piece subjected to the flexural test at ordinary temperature was ground by using WC-Co vessel and X-ray diffraction pattern was measured. As a result, $\beta'$-phase was 47 wt. %, and O'-phase was 53 wt. %. Though there were some small peaks indentified as WC, they were neglected as contaminated through grinding. When the flexural test piece was kept at 00° C. in the atmosphere for 100 hours, the weight increase due to oxidation was 0.12 mg/cm² indicating high oxidation-resistance.

EXAMPLE 3

The sintered body of 30×40×8 mm prepared in Example 2 was subjected to HIP at 1900° C. at 1900 atm. A piece of 3×4×40 mm was quarried out of the sintered body, and kept at 1300° C. in the atomosphere for 100 hours. The weight increase due to oxidation was 0.02 mg/cm² indicating further high oxidation-resistance.

The flexural strength of the test piece was 62 kg/mm² at ordinary temperature and 52 kg/mm² at 1300° C., and $\beta'$-phase was 49 wt. % and O'-phase was 51 wt. %.

EXAMPLE 4

Aluminum isopropoxide (4 g on the basis of $Al_2O_3$) was dissolved in 200 cc of n-hexane. 96 g of $Si_3N_4$ (UBE INDUSTRIES) was added to the solution, and mixed by a ball mill for 24 hours. The slurry was dried at 200° C. in vacuo, and passed through 200 mesh sieve. The mixed powder was subjected to CIP of 3 tons to prepare a column-shaped pressed powder body of 30 mm in width×60 mm in length. The pressed powder body was placed in a Vycor glass capsule having an inside diameter of 34 mm, and sealed at 1200° C. in vacuo. The glass capsule was placed in a HIP oven, and the pressure was kept less than 0.2 MPa up to 1000° C. Then, HIP was carried out at higher than 1000° C. at a pressure of 200 MPa. The temperature elevation rate was 10° C./min. up to 1300° C., and waited until pressuring was completed. Then temperature elevation began again at a rate of 10° C./min., and kept at 1850° C. for 2 hours. The pressuring medium was Ar gas. After the HIP, the glass capsule was removed by sandblasting to obtain a sintered body of 24.3 mm in width x 48.9 mm in length. The density of the sintered body was 3.12 g/cc.

One end of the column was quarried out, and after abrading, the phases were identified by using X-ray. As a result, the phases were composed of two phases of $\beta'$-phase and O'-phase, and the ratio of O'-phase was calculated as 13 wt. %. A flexural test piece of 3×4×40 mm was quarried out of the sintered body, and flexural test was carried out. The flexural strength was 72 kg/mm² at ordinary temperature and 62 kg/mm² at 1350° C.

EXAMPLE 5

Aluminum isopropoxide (9 g on the basis of $Al_2O_3$) was dissolved in 400 cc of n-hexane, 91 g of $Si_3N_4$ and 60 g of SiC were added to the solution, and mixed by a ball mill for 24 hours. The molding was carried out in a manner similar to Example 1, and sintered at 1950° C. Then, the sintered body was subjected to HIP at 1950° C. at 190 MPa for 2 hours.

Peaks indentified as a poly-type of SiC were present in the X-ray diffraction pattern of the sintered body in addition to O'-phase and $\beta'$—-phase. When the peaks of the poly-type SiC were excluded, O'-phase was calculated as 26 wt. %, and $\beta'$-phase was 74 wt. %. A flexural test piece of 3×4×40 mm was quarried out of the sintered body, and three point flexural test was carried out. The three point flexural strength was 65.2 kg/mm² at room temperature and 64.7 kg/mm² at 1300° C. The fracture toughness was 3.8 MN/m$^{3/2}$, while the fracture toughness in the case that SiC was not blended was 2.8 MN/m$^{3/2}$.

EXAMPLE 6

Alumina sol (12 g on the basis of $Al_2O_3$) was added to 88 g of $Si_3N_4$ (UBE INDUSTRIES), and mixed by a ball mill for 24 hours. Then, a sintered body was prepared by the same method as shown in Example 3. When the phases of the sintered body was measured, X-phase was found in addition to $\beta'$-phase and O'-phase. A flexural test was carried out, and the flexural strength was 86.3 kg/mm² at ordinary temperature and 46.1 kg/mm² at 1300° C.

When the sintered body was heated at 1950° C. at 10 MPa for 2 hours, the X-phase vanished and the sintered body was double phase complex sialon composed of $\beta'$-phase and O'-phase alone. The ratio of O'-phase was 32 wt. %, and $\beta'$-phase was 68 wt. %. The flexural strength was 84.8 kg/mm² at ordinary temperature and 86.6 kg/mm² at 1300° C. Therefore, the strength at 1300° C. was increased about twice.

COMPARATIVE EXAMPLE 1

$Si_3N_4$ (UBE INDUSTRIES) was calcined at 1000° C., and molded as it is. Then, it was sintered by the same method as Example 1. The density of the sintered body sintered at 1900° C. was 1.65 g/cc, and the density of the sintered body treated with HIP was 1.67 g/cc. The strength was the degree that it was snapped by hand. As the phase composition $\alpha$-phase was 58 wt. %, $\beta$-phase was 38 wt. % and O'-phase was 4 wt. %.

We claim:

1. A ceramic material consisting essentially of a double phase complex sialon sintered body of $\beta'$-type sialon ($Si_{6-z}Al_zO_zN_{8-z}$) having $\beta$-type $Si_3N_4$ crystalline structure and O'-type sialon ($Si_{2-x}Al_xO_{1+x}N_{2-x}$) having $Si_2N_2O$ crystalline structure being composed of the four elements of Si, Al, O and N and having a ratio of $\beta'$-type sialon/O'-type sialon of 7/1 to 3/5 by weight ratio, and wherein less than 50 wt % of at least one compound selected from the group consisting of carbides SiC, TiC, ZrC, $Al_4C_3$ and $B_4C$, nitrides TiN, ZrN, and BN, carbonitrides TiCN and borides $TiD_2$ and $ZrB_2$ is present forming a phase different from the phase of $\beta'$-type sialon and the phase of O'-type sialon.

2. A ceramic material consisting essentially of a double phase complex sialon sintered body of $\beta'$-type sialon ($Si_{6-z}Al_zO_zN_{8-z}$) having $\beta$-type $Si_3N_4$ crystalline structure and O'-type sialon ($Si_{2-x}Al_xO_{1+x}N_{2-x}$) having $Si_2N_2O$ crystalline structure being composed of the four elements, of Si, Al, O and N and having a ratio of $\beta'$-type sialon/O'-type sialon of 7/1 to 3/5 by weight ratio.

3. The ceramic material of claim 1 or claim 2 wherein not more than 500 ppm as the total content of alkali metal elements and alkaline earth metal elements are present.

4. The ceramic material of claim 1 or claim 2 where not more than 50 ppm as the total content of rare earth elements are present.